(12) United States Patent
Wolf

(10) Patent No.: US 7,159,948 B1
(45) Date of Patent: Jan. 9, 2007

(54) RESTRAINING DEVICE FOR SECURING A CHILD SAFETY SEAT TO A PLURALITY OF AUTOMOBILE ANCHORS

(76) Inventor: Randy Wolf, 816 N. Highway 287, Berthoud, CO (US) 80513

( * ) Notice: Subject to any disclaimer, the term of this patent is extended or adjusted under 35 U.S.C. 154(b) by 0 days.

(21) Appl. No.: 11/375,392

(22) Filed: Mar. 14, 2006

(51) Int. Cl.
*A47C 31/00* (2006.01)

(52) U.S. Cl. ............... 297/463.1; 297/253; 297/454

(58) Field of Classification Search ............... 297/253, 297/464, 468, 485, 463.1, 463.2; 40/316; 116/200
See application file for complete search history.

(56) References Cited

U.S. PATENT DOCUMENTS

| | | | |
|---|---|---|---|
| 3,768,862 A * | 10/1973 | Williams, Jr. .............. | 297/468 |
| 6,024,408 A * | 2/2000 | Bello et al. ............... | 297/250.1 |
| 6,592,183 B1 * | 7/2003 | Kain ........................... | 297/253 |
| 6,749,260 B1 * | 6/2004 | Abel ........................ | 297/250.1 |
| 2005/0166370 A1 * | 8/2005 | Miles ........................... | 24/302 |

* cited by examiner

*Primary Examiner*—Milton Nelson, Jr.
(74) *Attorney, Agent, or Firm*—Dale J. Ream

(57) ABSTRACT

A restraining device for securing a child safety seat to the LATCH system anchors of an automobile includes a strap having first and second opposed ends. Respective hooks or other fasteners are connected to the opposed ends for selective attachment to respective anchors of an automobile. The restraining device includes a ratchet mechanism enabling the strap to be incrementally tightened and thus increasing tension forces between the first and second strap ends. A strain gauge is also included for visually indicating the tension forces and indicating when the straps are at safe or unsafe tension conditions.

20 Claims, 6 Drawing Sheets

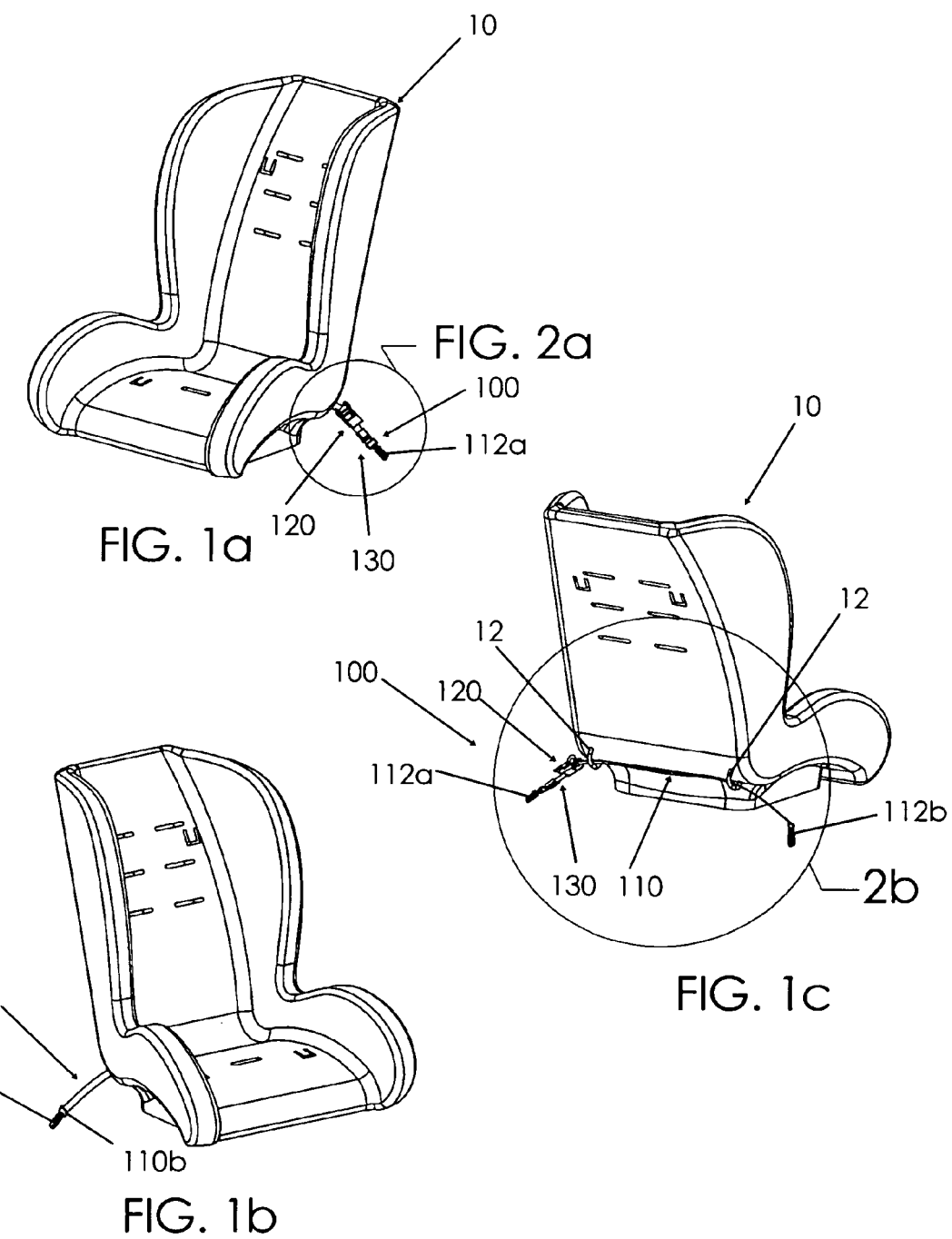

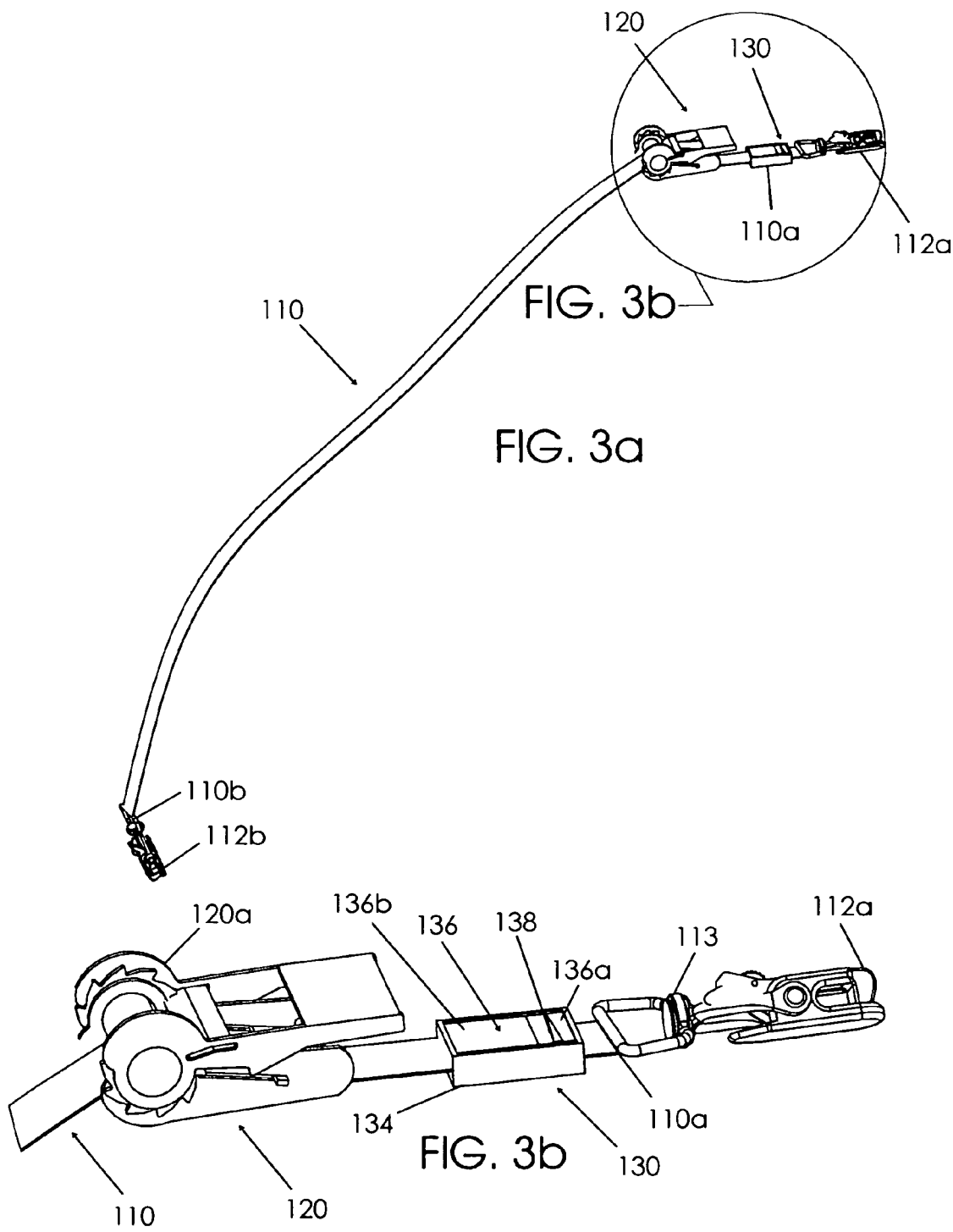

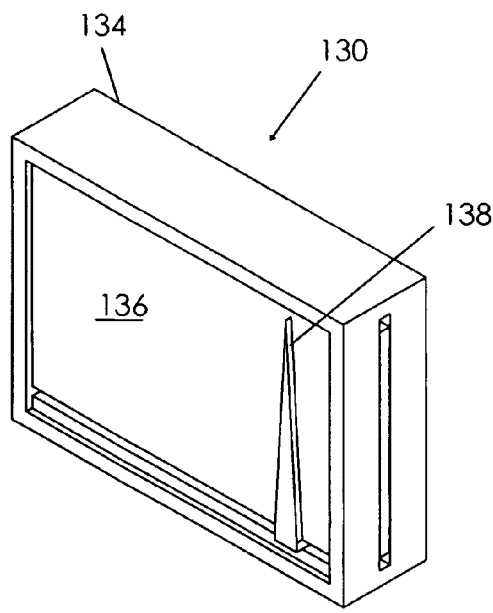
FIG. 4a
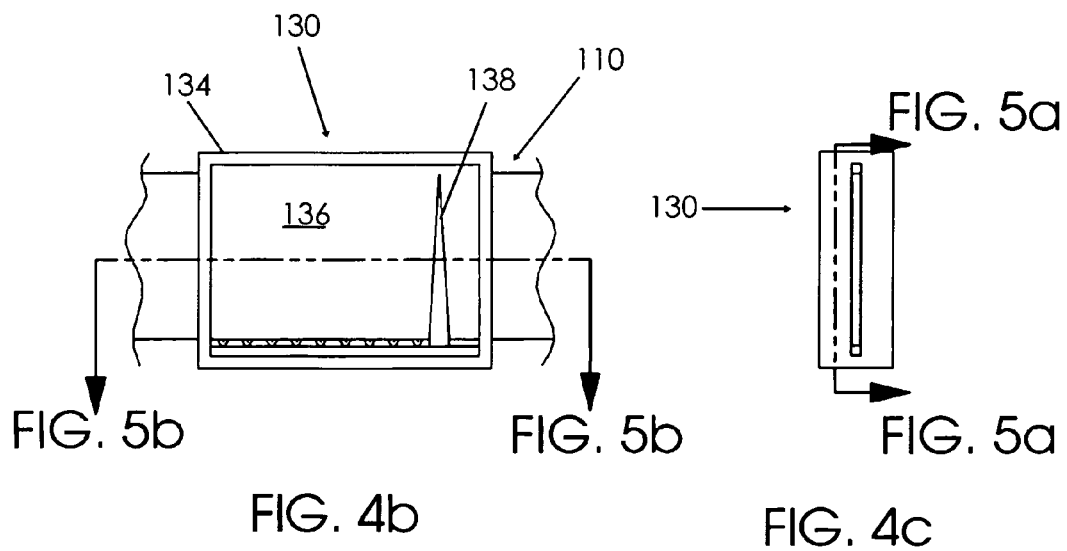
FIG. 4b
FIG. 4c

RESTRAINING DEVICE FOR SECURING A CHILD SAFETY SEAT TO A PLURALITY OF AUTOMOBILE ANCHORS

BACKGROUND OF THE INVENTION

This invention relates generally to seat belts and, more particularly, to a restraining device for securing a child safety seat to a plurality of automobile anchors.

Car seats for infants and toddlers may be secured to an automobile seat with traditional seat belts or, preferably, by utilizing the LATCH (Lower Anchors and Tethers for Children) system in newer model cars. Unfortunately, the LATCH system is often not understood by parents or caregivers or is not installed and used properly. Even when used, the traditional system, by itself, does not provide a desired level of safety or user-friendliness. Various devices have been proposed in the art for connecting to the LATCH system, such as with hooks and straps. Although assumably effective for their intended purposes, it is often difficult for users to tighten the straps or to determine when the straps are tight enough.

Therefore, it would be desirable to have a restraining device for properly and safely securing a child safety seat to a plurality of automobile anchors. Further, it would be desirable to have a restraining device that enables a user to incrementally tighten the straps of the restraining device. In addition, it would be desirable to have a restraining device having a tension gauge that indicates when the straps have been sufficiently tightened.

SUMMARY OF THE INVENTION

A restraining device for securing a child safety seat to a plurality of automobile anchors according to the present invention includes a strap having first and second ends. First and second hooks are attached to opposed ends of the strap for selective attachment to respective automobile lower anchors. In addition, the restraining device includes a ratcheting mechanism for incrementally tightening the strap to the anchors. Further, the restraining device includes a tension gauge having indicia for indicating when the strap has been tightened to a safe tension but not over tightened.

Therefore, a general object of this invention is to provide a restraining device for securing a child safety seat to the seat anchors of an automobile.

Another object of this invention is to provide a restraining device, as aforesaid, having a mechanical mechanism for incrementally tightening the strap or straps of a seat restraining device.

Still another object of this invention is to provide a restraining device, as aforesaid, which includes a gauge for indicating when a sufficient and safe tension has been applied to the strap.

A further object of this invention is to provide a restraining device, as aforesaid, that is quick and easy to install and use.

A still further object of this invention is to provide a restraining device, as aforesaid, that is economical to manufacture.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 1a is a front perspective view of a restraining device in use with a child safety seat according to a preferred embodiment of the present invention;

FIG. 1b is another front perspective view of the restraining device as in FIG. 1a taken from another angle;

FIG. 1c is a rear perspective view of the restraining device as in FIG. 1a;

FIG. 2a is an isolated view on an enlarged scale of a tightening mechanism of the restraining device as in FIG. 1a;

FIG. 3a is a perspective view of the restraining device as in FIG. 1a removed from the child safety seat;

FIG. 3b is an isolated view on an enlarged scale of the tightening mechanism as in FIG. 3a;

FIG. 4a is a perspective view on an enlarged scale of the tension gauge as in FIG. 3b;

FIG. 4b is a front view of the tension gauge as in FIG. 4a;

FIG. 4c is a side view of the tension gauge as in FIG. 4a;

DESCRIPTION OF THE PREFERRED EMBODIMENT

Figure 2A:
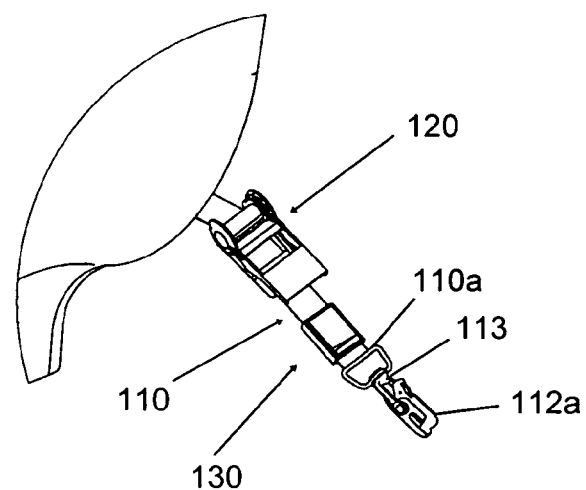

A restraining device 100 according to the present invention will now be described in detail with reference to FIGS. 1a through 6b of the accompanying drawings. More particularly, a restraining device 100 for securing a child safety seat 10 to a plurality of automobile anchors (not shown) according to the current invention includes a strap 110, a tightening mechanism 120, and a tension gauge 130.

Figure 2B:
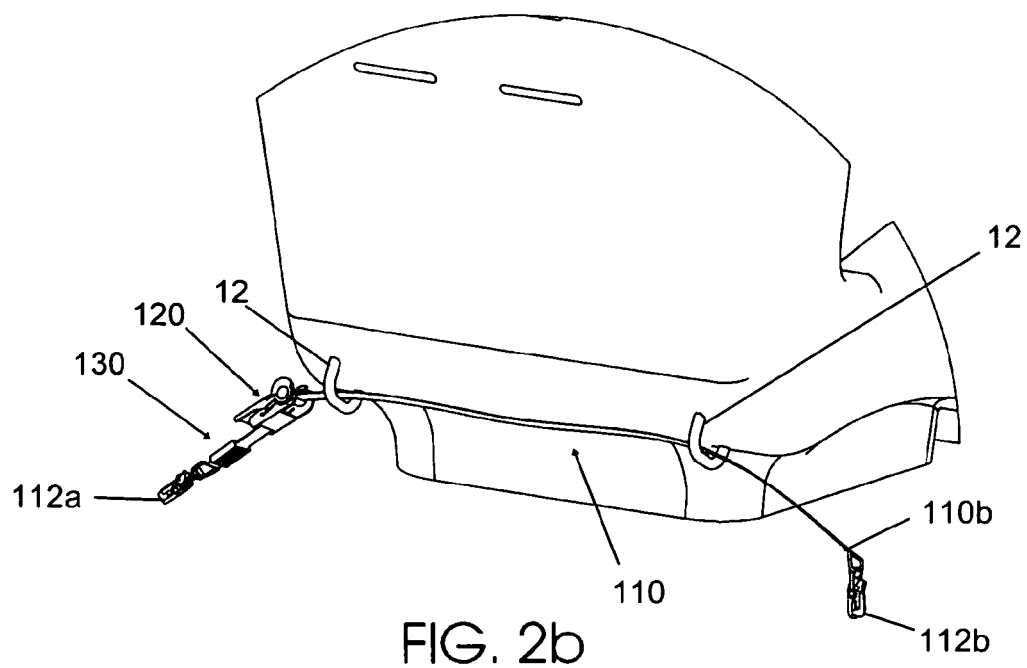
FIG. 2b is an isolated view on an enlarged scale of the restraining device as in FIG. 1c.
Figure 5A:
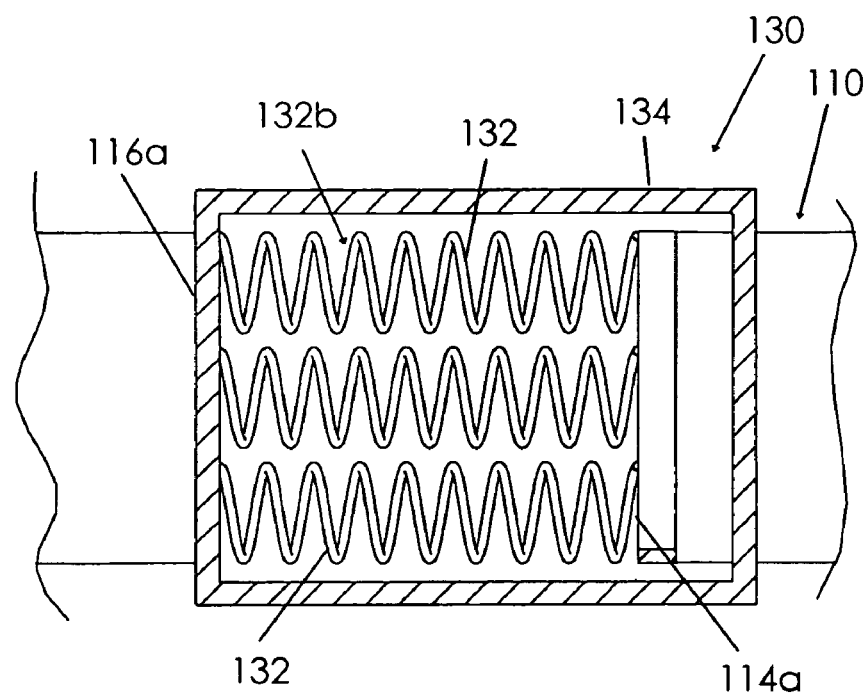
FIG. 5a is a sectional view of the tension gauge taken along line 5a–5a as in FIG. 4c with the springs in a relaxed configuration.
Figure 5B:
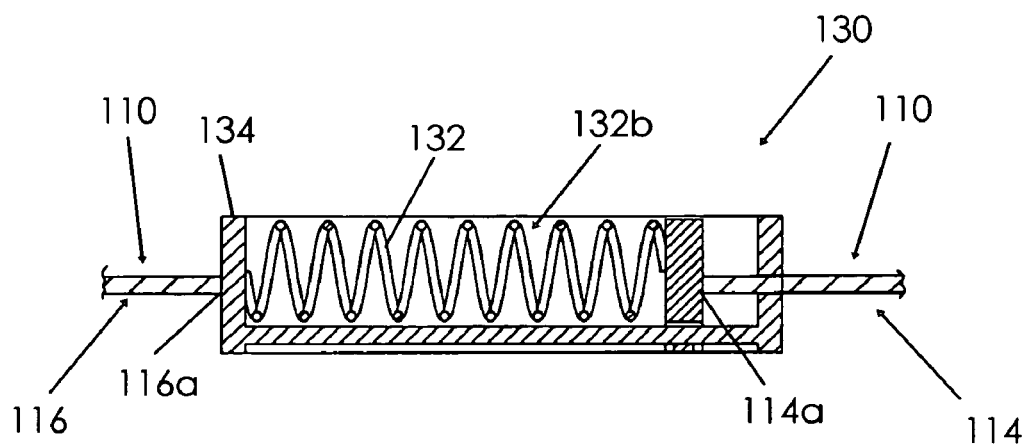
FIG. 5b is a sectional view of the tension gauge taken along line 5b–5b of FIG. 4b with the springs in a relaxed configuration.
Figure 6A:
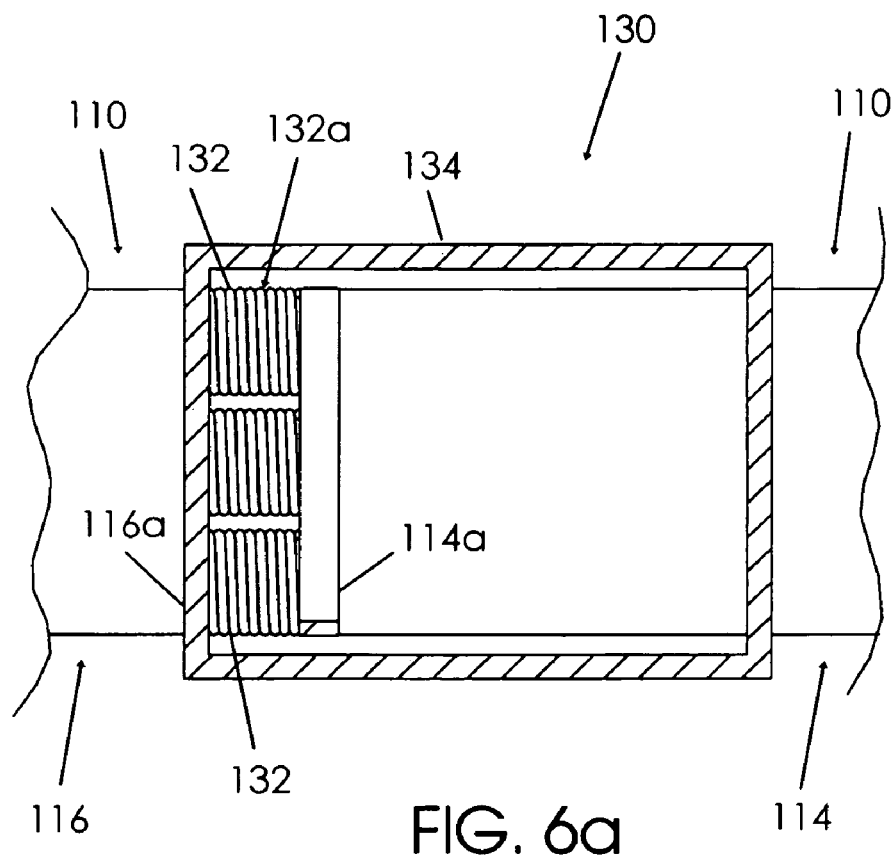
FIG. 6a is a sectional view as in FIG. 5a with the springs in a tensioned configuration.
Figure 6B:
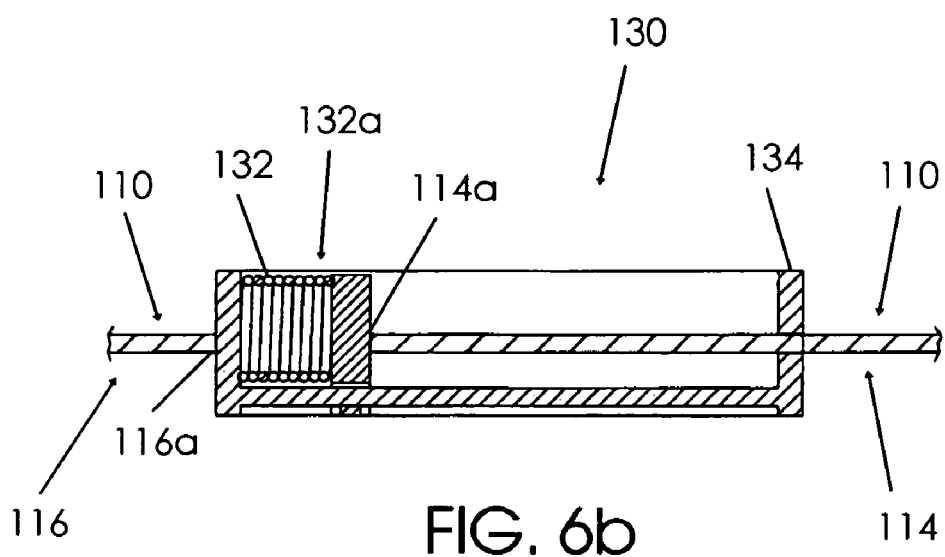
FIG. 6b is a sectional view as in FIG. 5b with the springs in a tensioned configuration.

The strap 110 has first and second ends 110a, 110b (FIG. 2b). A first hook 112a is attached to the strap first end 110a for selective attachment to one of the anchors, and a second hook 112b is attached to the strap second end 110b for selective attachment to another of the anchors. The child safety seat 10 includes a plurality of fastening loops 12, and the strap 110 is configured to pass through the plurality of fastening loops 12 (FIGS. 1c and 2b). At least one of the first and second hooks 112a, 112b may also be sized to pass through the plurality of fastening loops 12, or at least one of the first and second hooks 112a, 112b may be selectively removable from the strap 110. The first hook 112a may include a swivel 113 that allows the first hook 112a to be rotated about the strap first end 110a (FIG. 3b), and the second hook 112b may be similarly rotatable about the strap second end 110b.

The tightening mechanism 120 is in communication with the strap 110 for selectively increasing tension forces between the strap first and second ends 110a, 110b (FIGS. 2a and 3b). It is critical for any child in the child safety seat 10 that the child safety seat 10 is appropriately attached to the automobile anchors, and appropriate attachment requires predetermined tension forces between the strap first and second ends 110a, 110b. As shown in FIG. 3b, the tightening mechanism 120 preferably includes a ratcheting mechanism 120a that provides a mechanical advantage to a user tightening the strap 110.

The tension gauge 130 (best shown in FIGS. 3b–6b) is in communication with the strap 110 for determining and displaying the tension forces between the strap first and second ends 110a, 110b. In an exemplary embodiment, the tension gauge 130 may include a spring 132, the strap 110 may include a first portion 114 that includes the first end 110a and a first interior end 114a, and the strap 110 may include a second portion 116 that includes the second end 110b and a second interior end 116a. Opposed ends of the spring 132 may be operatively attached to the first and second interior ends 114a, 116a of the strap 110 (FIGS. 5a–6b). A housing 134 preferably houses the spring 132 for safety to users (i.e., so users are not pinched by the spring) and to maintain the integrity of the spring 132 (i.e., so the spring 132 is not tampered with). It is to be understood that more than one spring 132 may be used, and the tension gauge 130 may be in communication with the strap 110 in other ways.

As shown in FIGS. 3b–4b, the tension gauge 130 may include a face 136 and an indicator 138 that cooperatively display whether the tension forces between the strap first and second ends 110a, 110b correspond to safe or unsafe conditions. The face 136 preferably includes indicia 136a denoting safe conditions and indicia 136b denoting unsafe conditions. These safe and unsafe conditions respectively correspond to predetermined amounts of tension forces between the strap first and second ends 110a, 110b. The indicia 136a denoting safe conditions preferably includes a first color field (a region having a first color), and the indicia 136b denoting unsafe conditions preferably includes a second color field (a region having a second color) (FIG. 3b). While the second color field is preferably a red color field, other colors may be used.

Though either the face 136 or the indicator 138 may be operatively attached to the spring 132, it is currently preferred that the indicator 138 is a mobile indicator operatively attached to the spring 132 and that the face 136 is a stationary face 136 having stationary indicia 136a, 136b. As such, changes in the configuration of the spring 132 cause the mobile indicator 138 to select between the indicia 136a denoting safe conditions and the indicia 136b denoting unsafe conditions. The indicator 138 preferably has a color that is different from that of the first and second color fields 136a, 136b so that the indicator 138 may be easily distinguished.

Both the tension gauge 130 and the tightening mechanism 120 are preferably adjacent either the first or second end 110a, 110b of the strap 110. This allows a user to fasten the respective hook 112a, 112b to one of the automobile anchors, use the tightening mechanism 120 to adjust the tension of the strap 110, and check the tension gauge 130 with minimal effort and movement.

In use, the strap 110 is passed through the safety seat fastening loops 12, and the first and second hooks 112a, 112b are attached to respective automobile anchors. The tightening mechanism 120 (i.e., the ratcheting mechanism 120a) may then be used to tighten the strap 110 (increase tension forces between the strap first and second ends 110a, 110b). Tightening the strap 110 causes the spring 132 to extend from a compressed configuration 132a (FIGS. 6a and 6b) to an extended configuration 132b (FIGS. 5a and 5b), which in turn causes the indicator 138 to move along the indicia 136b denoting unsafe conditions and the indicia 136a denoting safe conditions. When a predetermined amount of tension is reached, the indicator 138 may be located in the indicia 136a denoting safe conditions (FIG. 3b). At that point, the user can know that the safety seat 10 is safely secured to the automobile and that no additional tightening is necessary. The user may also check the tension gauge 130 at different times to ensure that the safety seat 10 remains safely secured to the automobile (i.e., that an appropriate amount of tension forces between the strap first and second ends 110a, 110b is maintained). The colors of the indicia 136a, 136b and the indicator 138 make it easy for the user to check the tension gauge 130 from a remote location, such as a front seat.

It is understood that while certain forms of this invention have been illustrated and described, it is not limited thereto except insofar as such limitations are included in the following claims and allowable functional equivalents thereof.

What is claimed is:

1. A restraining device for securing a child safety seat to a plurality of automobile anchors, said device comprising:
    a strap having first and second ends;
    a first hook attached to said strap first end for selective attachment to one of the anchors;
    a second hook attached to said strap second end for selective attachment to another of the anchors;
    a tightening mechanism in communication with said strap for selectively increasing tension forces between said strap first and second ends; and
    a tension gauge in communication with said strap for determining and displaying said tension forces between said strap first and second ends.

2. The device as in claim 1, wherein said tightening mechanism includes a ratcheting mechanism.

3. The device as in claim 1, wherein:
    said strap has first and second portions, said first portion including said first end and a first interior end, said second portion including said second end and a second interior end;
    said tension gauge includes a spring;
    said first and second interior ends are operatively attached to opposed ends of said spring;
    said tension gauge includes a face having stationary indicia denoting safe and unsafe conditions;
    a mobile indicator is operatively attached to said spring for selecting between said indicia denoting safe conditions and said indicia denoting unsafe conditions according to respective configurations of said spring.

4. The device as in claim 3, wherein said stationary indicia denoting safe and unsafe conditions respectively corresponds to predetermined amounts of said tension forces between said strap first and second ends.

5. The device as in claim 4, wherein said tightening mechanism includes a ratcheting mechanism.

6. The device as in claim 3, wherein:
    said indicia denoting safe conditions includes a first color field;
    said indicia denoting unsafe conditions includes a second color field; and
    said mobile indicator has a color that is different from that of said first and second color fields.

7. The device as in claim 6, wherein said second color field is a red color field.

8. The device as in claim 3, wherein said tension gauge includes a housing that encloses said spring.

9. The device as in claim 3, wherein said tension gauge is adjacent one of said first and second ends of said strap.

10. The device as in claim 9, wherein said tension gauge is adjacent said tightening mechanism.

11. The device as in claim 1, wherein:
said tightening mechanism is adjacent one of said first and second ends of said strap; and
said tension gauge is adjacent said tightening mechanism.

12. The device as in claim 1, wherein:
the child safety seat includes a plurality of fastening loops; and
said strap is configured to pass through the plurality of fastening loops.

13. The device as in claim 12, wherein at least one of the first and second hooks is sized to pass through the plurality of fastening loops.

14. The device as in claim 1, wherein:
said first hook is rotatable about said strap first end; and
said second hook is rotatable about said strap second end.

15. A restraining device for securing a child safety seat to a plurality of automobile anchors, said device comprising:
a strap having first and second ends;
a first hook attached to said strap first end for selective attachment to one of the anchors;
a second hook attached to said strap second end for selective attachment to another of the anchors;
a tightening mechanism in communication with said strap for selectively increasing tension forces between said strap first and second ends; and
a tension gauge in communication with said strap for determining and displaying said tension forces between said strap first and second ends, said tension gauge having a face and an indicator, said face having indicia denoting safe conditions and indicia denoting unsafe conditions, said face and said indicator cooperatively displaying whether said tension forces between said strap first and second ends correspond to safe or unsafe conditions.

16. The restraining device as in claim 15, wherein said tightening mechanism includes a ratcheting mechanism.

17. The restraining device as in claim 15, wherein:
said indicia denoting safe conditions includes a first color field;
said indicia denoting unsafe conditions includes a second color field; and
said indicator has a color that is different from that of said first and second color fields.

18. The restraining device as in claim 17, wherein said second color field is a red color field.

19. The restraining device as in claim 15, wherein:
the child safety seat includes a plurality of fastening loops;
said strap is configured to pass through the plurality of fastening loops; and
at least one of the first and second hooks is sized to pass through the plurality of fastening loops.

20. The restraining device as in claim 15, wherein:
said tension gauge is adjacent one of said first and second ends of said strap; and
said tension gauge is adjacent said tightening mechanism.

* * * * *